United States Patent
Miki et al.

(10) Patent No.: US 8,553,632 B2
(45) Date of Patent: Oct. 8, 2013

(54) BASE STATION APPARATUS, USER APPARATUS, AND METHOD USED IN MOBILE COMMUNICATION SYSTEM

(75) Inventors: Nobuhiko Miki, Yokohama (JP); Motohiro Tanno, Yokohama (JP); Mamoru Sawahashi, Yokohama (JP); Kenichi Higuchi, Saitama (JP); Yoshihisa Kishiyama, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 310 days.

(21) Appl. No.: 12/935,041

(22) PCT Filed: Mar. 17, 2009

(86) PCT No.: PCT/JP2009/055180
§ 371 (c)(1),
(2), (4) Date: Dec. 3, 2010

(87) PCT Pub. No.: WO2009/119385
PCT Pub. Date: Oct. 1, 2009

(65) Prior Publication Data
US 2011/0075750 A1    Mar. 31, 2011

(30) Foreign Application Priority Data
Mar. 28, 2008    (JP) .................................. 2008-088103

(51) Int. Cl.
*H04W 4/00*    (2009.01)
(52) U.S. Cl.
USPC ........................... 370/329; 370/330; 375/260
(58) Field of Classification Search
USPC .......... 370/208, 216, 241, 480, 395.4, 395.1, 370/330, 337, 334, 335, 469, 329; 375/260, 375/146
See application file for complete search history.

(56) References Cited

U.S. PATENT DOCUMENTS

| | | | |
|---|---|---|---|
| 2008/0095195 A1* | 4/2008 | Ahmadi et al. | 370/478 |
| 2009/0129332 A1* | 5/2009 | Dayal et al. | 370/330 |

(Continued)

FOREIGN PATENT DOCUMENTS

| | | |
|---|---|---|
| JP | 2006-304312 A | 11/2006 |
| JP | 2007-194868 A | 8/2007 |
| WO | 2006/109435 A1 | 10/2006 |

OTHER PUBLICATIONS

Office Action for Russian Application No. 2010142259/07 dated Sep. 20, 2012, with English translation thereof (18 pages).

(Continued)

*Primary Examiner* — Abdullah Riyami
(74) *Attorney, Agent, or Firm* — Osha Liang LLP

(57) ABSTRACT

A base station apparatus is used in a region in which a first system and a second system co-exist. In the first system, mobile communication is conducted using a variable system bandwidth not more than a basic bandwidth. In the second system, mobile communication is conducted using a variable system bandwidth which is not more than a bandwidth of an advanced system band which is at least as wide as multiple of the basic bandwidths. The base station apparatus generates a control signal for the first system and a control signal for the second system, orthogonally multiplexes them, and includes the same in a downlink signal to transmit the downlink signal. The advanced system band is divided such that it includes multiple of areas (P, Q, R, S) of the basic bandwidth. The control signal for the first system is included in one of the areas (Q). The control signal for the second system is included in at least one of the areas (P, Q, R, S).

12 Claims, 11 Drawing Sheets

(56) References Cited

U.S. PATENT DOCUMENTS

2009/0161591 A1* 6/2009 Ahmadi et al. ............... 370/312
2009/0185632 A1* 7/2009 Cai et al. ...................... 375/260
2011/0103406 A1* 5/2011 Cai et al. ...................... 370/480

OTHER PUBLICATIONS

International Search Report w/translation from PCT/JP2009/055180 dated Jun. 2, 2009 (3 pages).

Written Opinion from PCT/JP2009/055180 dated Jun. 2, 2009 (3 pages).

3GPP TR 26.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN)"; Sep. 2006 (57 pages).

* cited by examiner

BASE STATION APPARATUS, USER APPARATUS, AND METHOD USED IN MOBILE COMMUNICATION SYSTEM

CROSS-REFERENCE TO RELATED APPLICATIONS

The present international application claims priority based on Japanese Patent Application No. 2008-088103 filed on Mar. 28, 2008, the entire content of which is hereby incorporated by reference.

BACKGROUND OF THE INVENTION

1. Field of the Invention

The present invention relates to the technical field of mobile communications and particularly relates to mobile communications systems, base station apparatuses, user apparatuses, and methods.

2. Description of the Related Art

Recently, in this type of technical field, studies on next generation mobile communications systems have been carried out arduously. A representative example of a mobile communications system to succeed the Third Generation (3G) is a Long Term Evolution (LTE) system, which is also called an E-UTRA (Evolved Universal Terrestrial Radio Access) system. In general, the Third Generation system can use a fixed bandwidth of 5 MHz to achieve a transmission rate in the order of up to 2 Mbps in downlink. In the LTE system, a variable bandwidth of 1.4 MHz to 20 MHz may be used to achieve a transmission rate in the order of up to 300 Mbps in downlink and approximately 75 Mbps in uplink. Moreover, as what is to succeed the LTE system, studies are being carried out also for an LTE-Advanced, an IMT-Advanced system, and a Fourth Generation (4G) system (below, the "IMT-Advanced" is referred to as "IMT-A"). A further increase in bandwidth and speed will be achieved in the IMT-A system. Thus, at the present and in the future, it is expected that these multiple systems will co-exist in various places (for the LTE system, see Non-patent document 1, for example.).

FIG. 1 schematically illustrates how the 3G system, the LTE system, and the IMT-A system co-exist in the same region. When multiple new and old systems of different radio access schemes co-exist, it is important to maintain backward compatibility. Maintaining backward compatibility is preferable not only for the user, but also for the operator. When promoting a study of a new system while maintaining backward compatibility, it is particularly important as to how the control signals are transmitted by the old and new systems. However, with respect to how a control signal is transmitted by the new system while maintaining backward compatibility with the LTE system, etc., it appears that studies are not sufficiently being advanced at this time.

Non-patent document 1: 3GPP, TR25.912 (V7.1.0), "Feasibility study for Evolved UTRA and UTRAN, September 2006

SUMMARY OF THE INVENTION

Problems to be Solved by the Invention

The problem to be solved by the present invention is to efficiently transmit a control signal for each system while maintaining backward compatibility when multiple old and new mobile communications systems co-exist.

Means for Solving the Problem (DL-eNB) In one embodiment of the present invention, a base station apparatus is used which is used in a region in which at least a first system and a second system co-exist. Mobile communication is conducted in the first system using a variable system bandwidth not more than a basic bandwidth. Mobile communication is conducted in the second system using a variable system bandwidth which is no more than a bandwidth of an advanced system band which is at least as wide as multiple of the basic bandwidths. The base station apparatus includes a first generating unit which generates a control signal for the first system;

a second generating unit which generates a control signal for the second system;

a multiplexing unit which orthogonally multiplexes control signals from the first generating unit and the second generating unit; and a transmitting unit which transmits a downlink signal including a control signal after the orthogonal multiplexing. The advanced system band is divided such that it includes multiple areas of the basic bandwidth. The control signal for the first system is arranged to be included in one area. The control signal for the second system is arranged to be included in at least one area.

The control signal for the second system may be included in multiple areas and channel encoded for each of the areas.

The control signal for the second system may be included in multiple areas, and a unit for channel coding the control signal may be all of the multiple areas.

The control signal for the second system may be arranged to be included within one area. An area in which the control signal for the second system is included may be set for each user.

The control signal after the orthogonal multiplexing and a data signal including user traffic data may be orthogonally multiplexed using at least a time division multiplexing scheme.

(DL-UE) In one embodiment of the present invention, a user apparatus of a second system is used in a region in which at least a first system and the second system co-exist. The user apparatus includes a demultiplexing unit which demultiplexes a control signal within a received signal from other signals;

an obtaining unit which takes out, from the control signal, control information intended for an own apparatus; and a unit which receives or transmits a data signal including user traffic data according to control information intended for the own apparatus. The advanced system band is divided such that it includes multiple areas of a basic bandwidth. The control signal for the first system is included in one area and the control signal for the second system is included in at least one area.

(UL-eNB) In one embodiment of the present invention, a base station apparatus is used in a region in which at least a first system and a second system co-exist. The base station apparatus includes a first obtaining unit which takes out a control signal for the first system from a received signal;

a second obtaining unit which takes out a control signal for the second system from a received signal; and a scheduling unit which schedules allocating of a radio resource according to control signals from the first and the second obtaining units. The advanced system band is divided such that it includes multiple areas of the basic bandwidth, the control signal for the first system is arranged to be included in one area; and the control signal for the second system is arranged to be included in at least one area.

(UL-UE) In one embodiment of the present invention, a user apparatus of a second system is used in a region in which at least a first system and the second system co-exist. The user apparatus includes a generating unit which generates a control signal for the second system; and a transmitting unit which transmits the control signal. The advanced system band is divided such that it includes multiple areas of the basic bandwidth, the control signal for the first system is arranged to be included in one area and the control signal for the second system is arranged to be included in a bandwidth dedicated to the control signal that is included in at least one area and that neighbors a border of the area.

Advantage of the Invention

The present invention is desirable in efficiently transmitting a control signal for each system while maintaining backward compatibility when multiple old and new mobile communications systems co-exist.

DESCRIPTION OF THE PREFERRED EMBODIMENTS

Description of Notations

Figure 1:
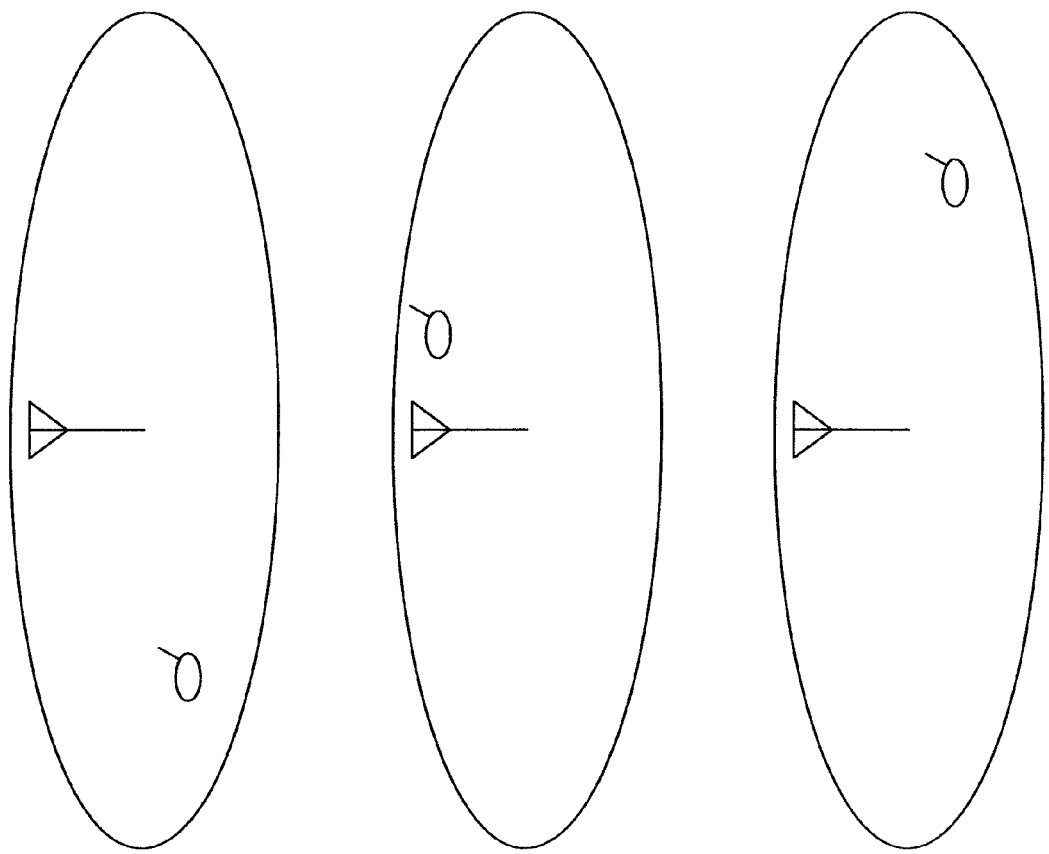
FIG. 1 is a diagram illustrating how 3G, LTE, and IMT-A systems co-exist.

102 scheduler
104 control signal generator for LTE system
110 data signal generator for LTE system
106 control signal generator for ITM-A system
112 data signal generator for ITM-A system
108, 114, 116 multiplexer
120, 122, 128 demultiplexer
124 control signal demodulator for LTE system
126 control signal demodulator for ITM-A system
130 data signal demodulator for LTE system
132 data signal demodulator for IMT-A system
202 demultiplexer
204 downlink control signal demodulator
206 downlink data signal demodulator
208 uplink data signal generator
210 uplink control signal generator

BEST MODE OF CARRYING OUT THE INVENTION

For convenience of explanations, the present invention is described by breaking it down into a few items. The breakdown of each item is not essential to the present invention, so that such recited matters may be combined appropriately. While specific numerical value examples are used to facilitate understanding of the present invention, such numerical values are merely examples, so that any appropriate value may be used unless specified otherwise.

The embodiment of the present invention is described from the following viewpoints:
  1. LTE system
  2. downlink
  2.1 channel coding unit
  2.2 mapping location
  3. uplink
  4. base station apparatus
  5. user apparatus Embodiment 1

Below, an example is described of a case such that an LTE system and an IMT-A system co-exist. However, the present invention is not limited to a combination of the LTE system and the IMT-A system, so that the present invention may be applied to any combination of various appropriate systems.

1. LTE System

In the LTE, for both uplink and downlink, at least one physical channel is shared by multiple mobile stations (user apparatuses) to conduct mobile communication. In downlink, an orthogonal frequency division multiple access (OFDMA) scheme is used. In uplink, a single carrier-frequency division multiple access (SC-FDMA) scheme is used. The SC-FDMA scheme is also called a DFT spread (discrete Fourier transformation spread) OFDM scheme. Channels shared by multiple mobile stations, which are generally called shared channels, are called a physical uplink shared channel (PUSCH) in uplink and a physical downlink shared channel (PDSCH) in downlink.

In a communications system using the shared channels, it is necessary to signal, for each sub-frame, in principle, which mobile station the shared channel is allocated to. A control channel used in the signaling is called a physical downlink control channel (PDCCH). The PDCCH is called a downlink L1/L2 control channel, a DL-L1/L2 control channel, or downlink control information (DCI). The PDCCH information includes a downlink/uplink (DL/UL) scheduling grant and a transmission power control (TPC) bit, for example.

The PDCCH is mapped to one to three OFDM symbols from the beginning, out of 14 OFDM symbols, for example, within one sub-frame. How many OFDM symbols from the beginning the PDCCH is mapped to is specified by a below-described PCFICH, and is reported to a mobile station.

Moreover, in an OFDM symbol which includes the PDCCH, a physical control format indicator channel (PC-FICH) and a physical HARQ indicator channel (PHICH: a physical hybrid ARQ indicator channel) are also transmitted.

The PCFICH is a signal for reporting, to a mobile station, the number of OFDM symbols including the PDCCH. The PCFICH may be called a downlink (DL) L1/L2 control format indicator. The PHICH is a channel which transmits transmission acknowledgment information on the physical uplink shared channel (PUSCH). The transmission acknowledgement information includes ACK (acknowledgement), which is a positive response, and NACK (negative acknowledgement), which is a negative response.

Figure 2:
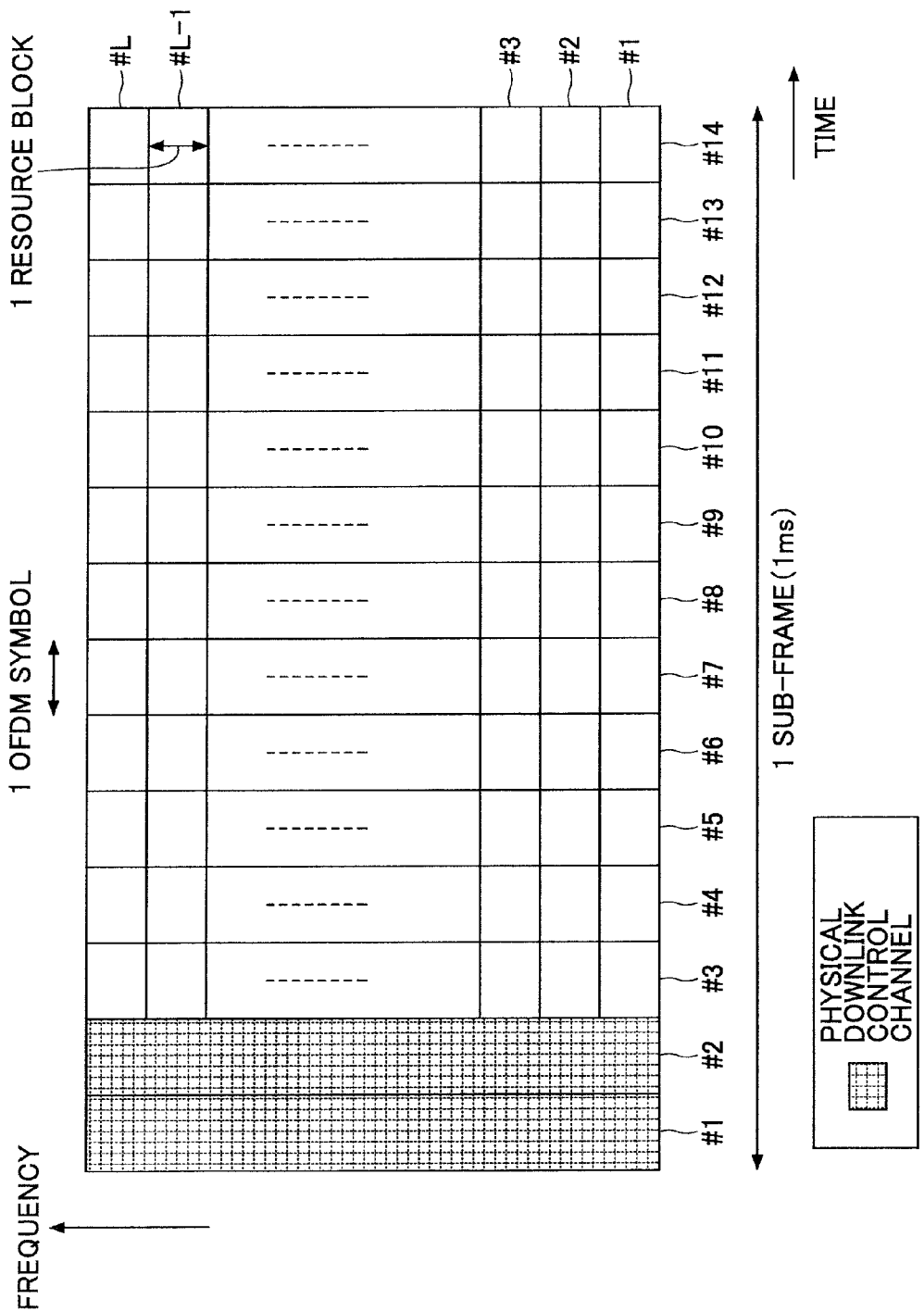
FIG. 2 is a diagram illustrating an example of a downlink sub-frame configuration in the LTE system.

FIG. 2 shows an example of a downlink sub-frame configuration. In downlink transmission, one sub-frame is 1 ms, for example, within which one sub-frame there are 14 OFDM symbols. The sub-frame is also called a transmission time interval (TTI). In FIG. 2, a number in a time axis direction (#1, #2, ..., #14) shows a number which identifies an OFDM symbol, while a number in a frequency axis direction (#1, #2, ..., #L−1, #L; L is a positive integer) shows a number which identifies a resource block A physical downlink control channel (PDCCH), etc., is mapped to M OFDM symbols at the beginning of the sub-frame. A value of M may be set in three ways: 1, 2, or 3. In FIG. 2, a physical downlink control channel (PDCCH) is mapped to two OFDM symbols (#1, #2) from the beginning of the one sub-frame (in other words, M=2). Then, in an OFDM symbol to which the physical downlink control channel (PDCCH) is not mapped, user data, a synchronization channel (SCH), a broadcast channel (BCH: physical broadcast channel), etc., are mapped. User data includes a control signal, etc., for processes of radio resource control (RRC), an IP packet such as a voice packet (VoIP), file transfer (FTP), web browsing, etc.

In the frequency direction, L resource blocks are provided in a system bandwidth. Here, a frequency bandwidth per resource block is 180 kHz, for example; 12 sub-carriers exist within one resource block, for example. Moreover, a total number L of resource blocks may be 25 when the system bandwidth is 5 MHz, 50 when the system bandwidth is 10 MHz, 100 when the system bandwidth is 20 MHz, etc.

Figure 3:
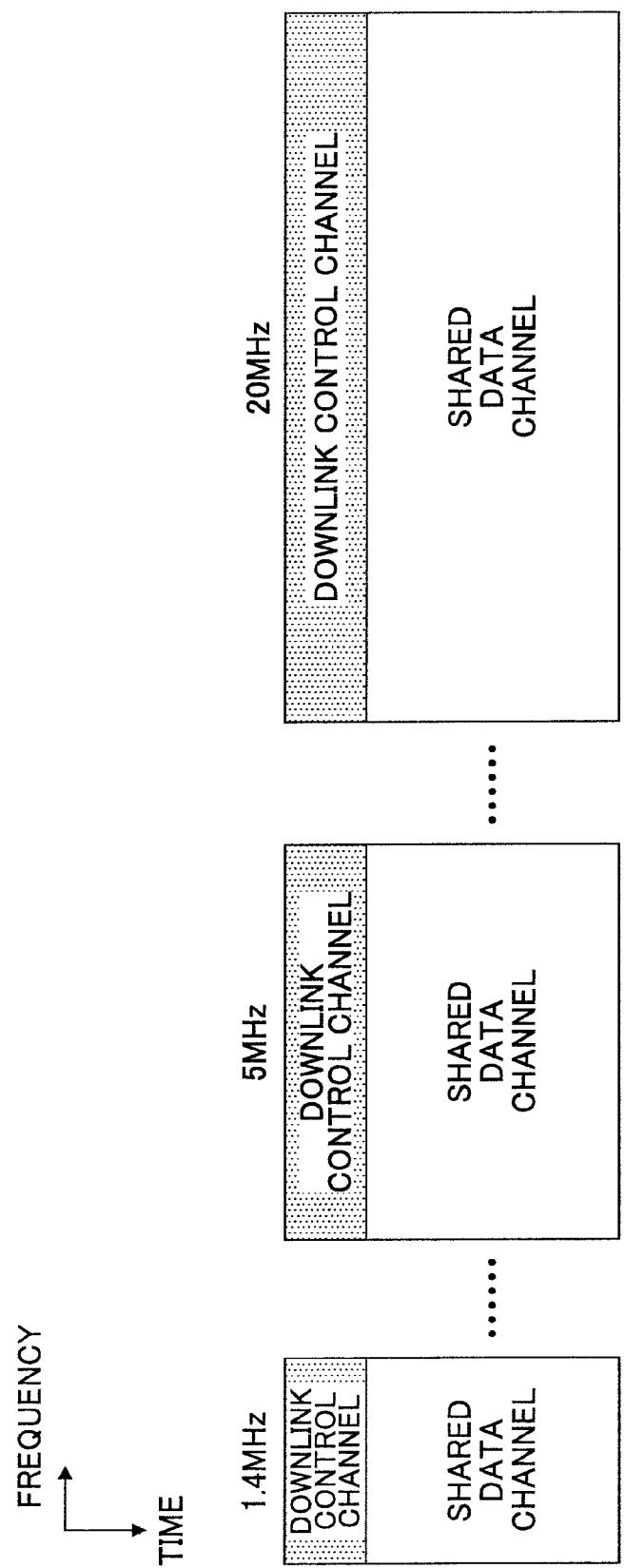
FIG. 3 is a diagram schematically illustrating various system bandwidths.

As shown in FIG. 3, in the LTE system, a system bandwidth of a size which differs from region to region or from cell to cell may be used. The user apparatus may conduct mobile communications using a shared channel within a range of the system bandwidth in the region or the cell.

Figure 4:
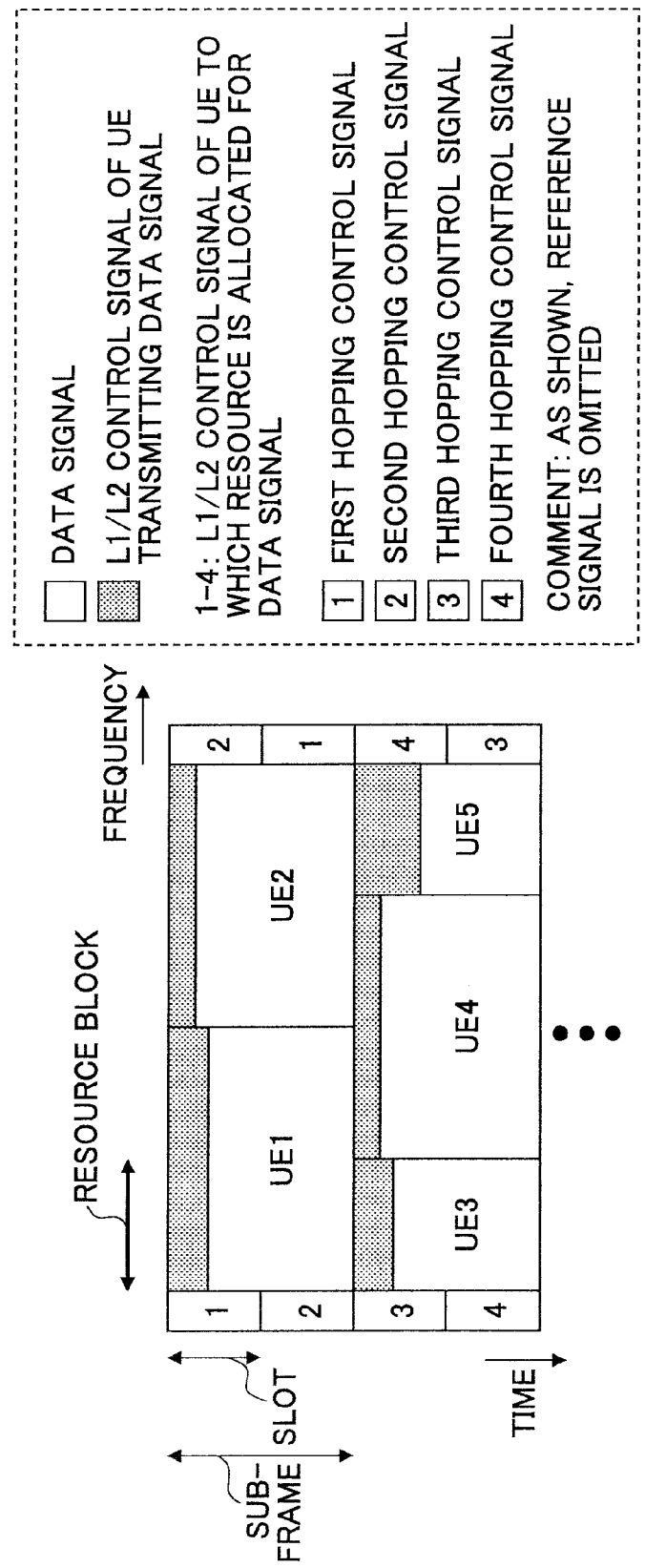
FIG. 4 is a diagram illustrating an example of an uplink sub-frame configuration in the LTE system.

FIG. 4 illustrates an example of an uplink sub-frame configuration in the LTE system. FIG. 4 shows a resource (multiple resource blocks) for transmitting a physical uplink shared channel (PUSCH), and a resource (a dedicated bandwidth for an uplink control signal) for a user to which such a resource is not allocated to transmit an uplink control signal. The latter is called a physical uplink control signal (PUCCH: physical uplink control channel). In the illustrated example, at least one of the four resource blocks is allocated to a user, first and second hopping control signals are provided in sub-frames or transmission time intervals (TTIs), and third and fourth hopping control signals are provided in a subsequent sub-frame. Each of the hopping control signals corresponds to the PUCCH. Hopping can be conducted on time and frequency in a TTI or sub-frame to obtain a diversity effect. Each of the first to fourth hopping control signals may be occupied by one user, or it may be multiplexed for multiple users. The size of the system bandwidth is provided at the same level as the downlink. In the LTE system, a system bandwidth is provided which is variable between uplink and downlink.

2. Downlink

Figure 5:
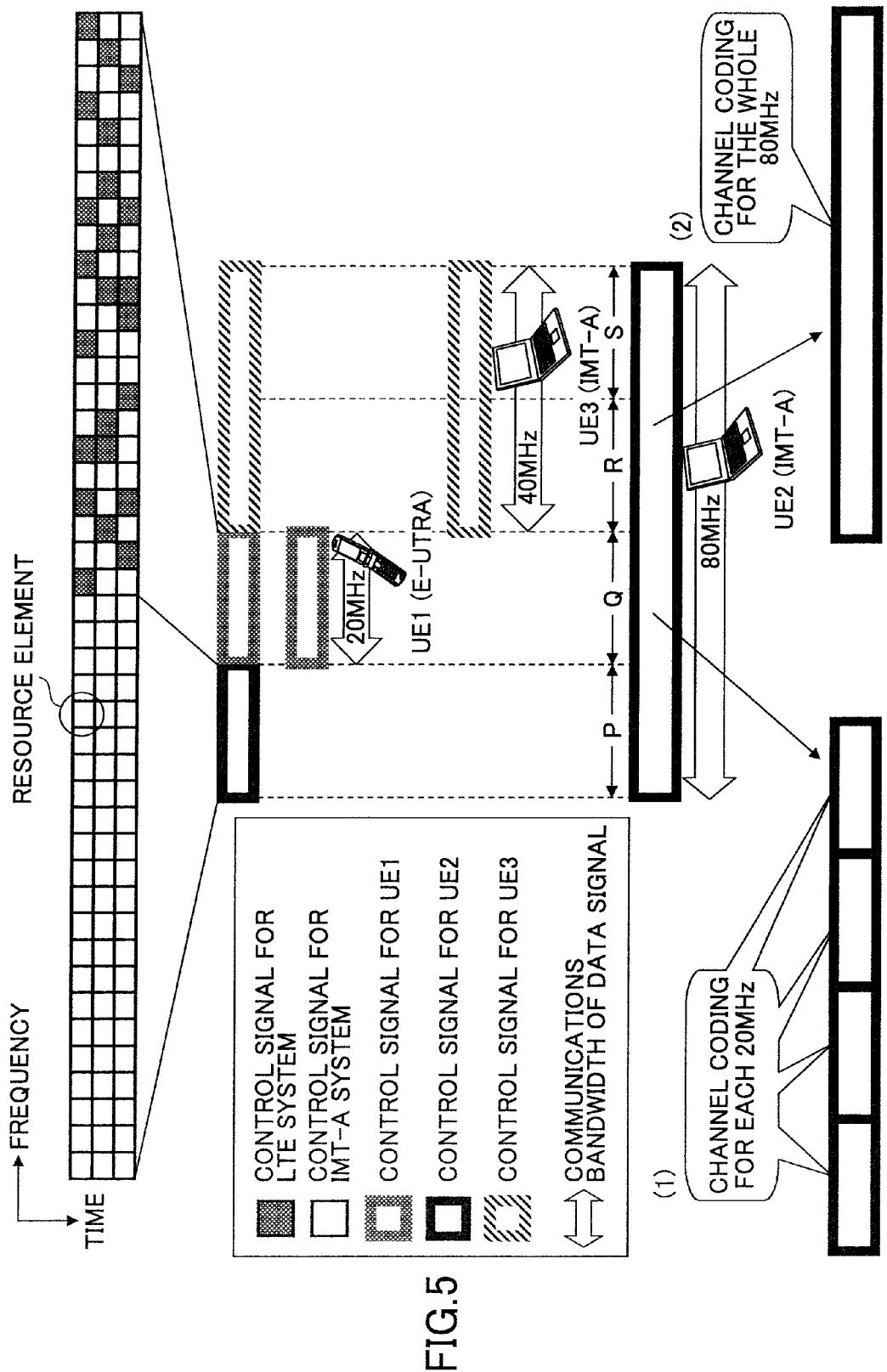
FIG. 5 is a diagram showing how a control signal is transmitted in downlink.

FIG. 5 shows how a control signal is transmitted in downlink according to one embodiment of the present invention. In the illustrated example, an 80 MHz system bandwidth is provided for an IMT-A system, so that mobile communication is conducted in a variable system bandwidth which is not more than 80 MHz. The system bandwidth may vary from region to region or from cell to cell. It is not mandatory for all the users to be able to communicate in 80 MHz, so that there may be a user which can only communicate in a bandwidth such as 40 MHz, for example. For convenience of explanations, a maximum system bandwidth provided in the IMT-A system is to be called an advanced systems bandwidth (the bandwidth is an advanced system bandwidth). The advanced system bandwidth is divided into areas of a standard bandwidth, which, in the illustrated example, is 20 MHz. While not mandatory, this 20 MHz corresponds to a maximum bandwidth in an LTE system.

As described above, in the LTE system, a control signal is mapped to first one to three OFDM symbols. Again in the present embodiment, a control signal is mapped to a first one to three OFDM symbols. In the illustrated example, a control signal is mapped to three OFDM symbols.

While the first user UE1 (E-UTRA) is subscribing to the LTE system, it is not subscribing to the IMT-A system. For convenience, assuming that the areas are named P, Q, R, and S from the left, all control signals intended for the user are mapped to a bandwidth of the area Q, which is the second from the left. As described above, the control signal includes uplink and downlink scheduling information, transmission power control information, etc. As shown in the upper portion, a control signal for the LTE system and a control signal for the IMT-A system are orthogonally multiplexed in units of resource elements by a Frequency Division Multiplexing scheme (FDM) and a Time Division Multiplexing scheme (TDM) (control channels within the IMT-Advanced system may be code multiplexed.) One resource element represents a resource of a unit specified by one sub-carrier and one OFDM symbol. As shown, a control signal intended for a user of the LTE system is only mapped into the area, which is the second from the left. Therefore, this user may decode only a 20 MHz bandwidth, which is the second from the left, to take out a control signal intended for an own device. A downlink control signal for the LTE system is channel coded such that it falls within the 20 MHz bandwidth.

In an example shown, only the area Q, which is the second from the left, can be used for the LTE system; however, the other areas P, R, and S may be used for the LTE system. The control signal may be mapped such that it falls within the 20 MHz area for the LTE system.

The second user UE2 (IMT-A) is subscribing to the IMT-A system. The control signal intended for the user is mapped to the entire Advanced system bandwidth (mapped to all four areas). As in the LTE system, transmission power control information, scheduling information, etc., for uplink and downlink may be included in the control information. Again, for the IMT-A system, each user shares a physical channel, and at least one resource block within a system bandwidth is used to conduct mobile communications.

The third user UE3 (IMT-A) is also subscribing to the IMT-A system. The control signal intended for the user is mapped not to the entire Advanced system bandwidth but a portion thereof (mapped to two areas or 40 MHz). The control signal intended for the third user UE3 (IMT-A) and the control signal intended for the first and the second users UE1, UE2 are channel coded separately.

The control signal intended for the LTE system user is channel coded within a 20 MHz allowed for the LTE system. Moreover, the control signals intended for the first, second, and third users are channel coded separately. Therefore, the first user UE1 (E-UTRA) properly decodes a control signal intended for an own device regardless of whether a control signal for the second or third user is present (in other words, whether another control signal is present does not have to be taken into account.) Conversely, the second and the third users UE2, UE3 (IMT-A) may also properly decode a control signal intended for an own device regardless of whether a control signal for the first user is present. In this way, both new and old users may properly take out a control signal intended for the own device regardless of whether a control signal for the other system is present.

2.1 Channel Coding Unit

When a control signal intended for a certain user belonging to the IMT-A system is mapped within a transmission frame across multiple areas, the control signal intended for the user (1) may be channel coded for each area of a standard bandwidth (20 MHz), or (2) may be channel coded collectively in all of the multiple areas. The lower left side of FIG. 5 shows how a control signal intended for UE2 (IMT-A) is mapped across four areas P, Q, R, and S, and how it is channel coded for each area. A control signal intended for UE3 (IMT-A) is mapped to the areas R and S. A control signal intended for UE1 (E-UTRA) belonging to an LTE system is mapped such that it falls within an area. In an example shown, the control signal intended for UE1 (E-UTRA) is mapped within 20 MHz of area Q. Therefore, channel coding the control signal again for the IMT-A system for each area for mapping is preferable from a point of view of increasing commonality with the LTE system.

The UE2 (IMT-A) can use an appropriate resource within all of the four areas (80 MHz). When the control signal is channel coded for each area, it is preferable that resource allocation information (scheduling information) be also divided for each area. For example, scheduling information for 20 MHz in the area P is mapped into the area P. Similarly, scheduling information for the bandwidths in the areas Q, R, and S is mapped into the respective areas Q, R, and S. In this way, the corresponding relationship between a resource for a shared channel and a mapping location for a control signal becomes simple. The corresponding relationship may be used when specifying a resource location of a shared channel to be retransmitted, for example.

(2) The lower right side of FIG. 5 shows how a control signal intended for UE2 (IMT-A) is channel coded, not for each area, but for all of the four areas. For the control signal intended for the UE3 (IMT-A), both of the two areas R and S are channel encoded. A control signal intended for UE1 (E-UTRA) belonging to the LTE system is mapped such that it falls within one area Q. For the control signal, it is not preferable from the point of view of commonality that a unit for channel coding differs between the IMT-A system and the LTE system. However, for the control signal for the IMT-A system, it is preferable from the point of view of increasing the error correcting capabilities to lengthen one unit of channel coding (coding gain increases.) Moreover, information within a control signal can be mapped to anywhere within multiple areas, so that this method is preferable also from a point of view of being able to expect a frequency diversity effect.

2.2 Mapping Location

Figure 6:
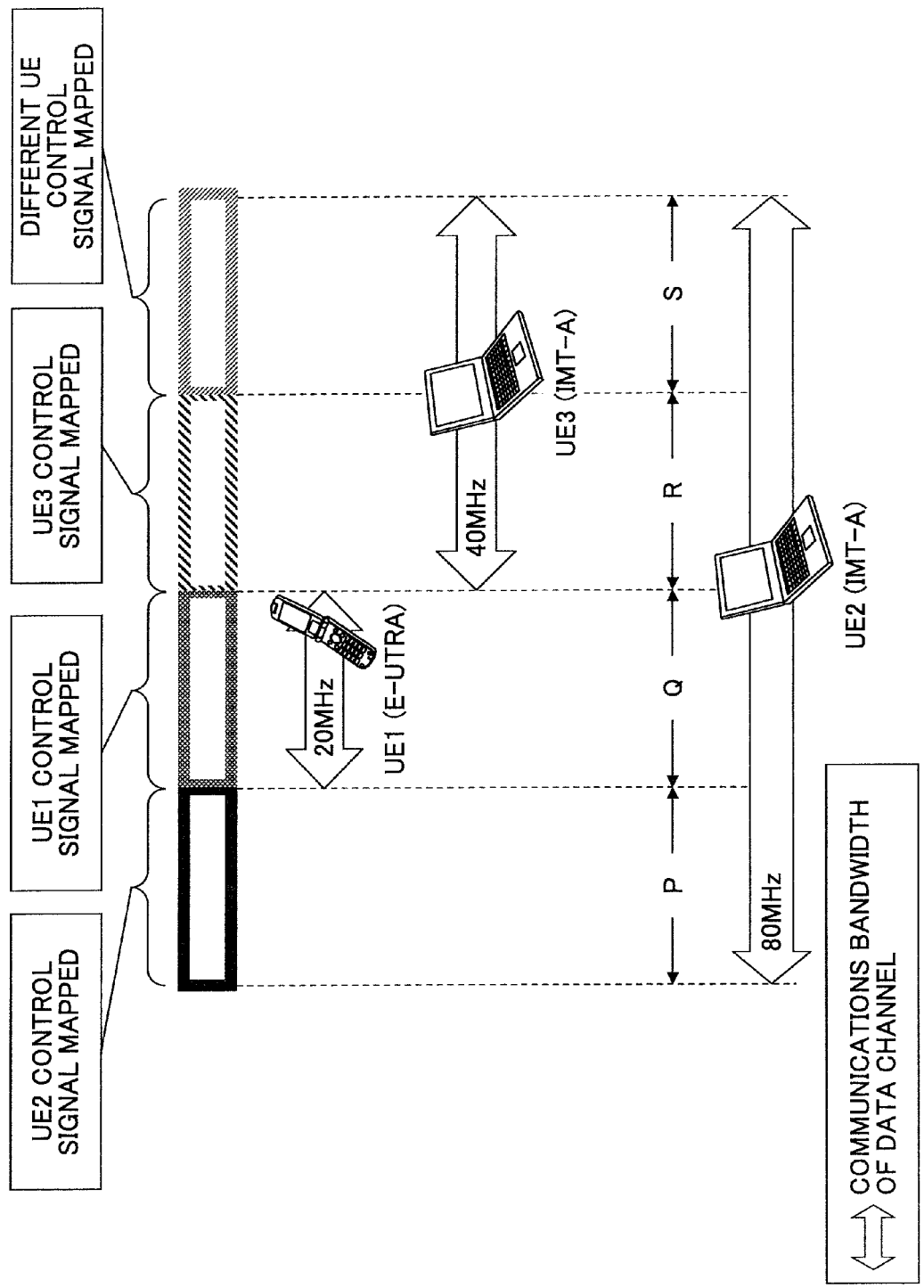
FIG. 6 is a diagram showing an example of mapping a downlink control signal in a different manner.

FIG. 6 shows an example of a different way of mapping a control signal. In the example in FIG. 5, the control signal for the IMT-A system is mapped to multiple areas P, Q, R, and S according to the bandwidth usable by the user. However, when the data signal is communicated in 80 MHz, for example, it is not necessarily the case that the control signal is also transmitted in 80 MHz. In the example shown in FIG. 6, regardless of the communications capability (how wide or narrow the usable bandwidth is) of the data signal of each user, a control signal for one user is only mapped to one area. The corresponding relationship between the user and the area is determined appropriately. In an example shown, a control signal intended for the first user UE1 is mapped to the area Q. This point is the same as the case of FIG. 5. The control signal for the second user UE2 is mapped to the area P. The control signal for the third user UE3 is mapped to the area R. A control signal intended for a different user (not shown; a user subscribing to the IMT-A system) is mapped to the area S. As a control signal intended for any user is mapped only into one area, this example is preferable from a point of view of maintaining commonality, etc.

Variation

In the above-described example, the standard bandwidth is 20 MHz, but a different bandwidth may be used. For example, the standard bandwidth may be 15 MHz. The standard bandwidth may take any value, but preferably corresponds to any variable system bandwidth of the LTE system. More specifically, the standard bandwidth preferably corresponds to any one of 1.4 MHz, 3 MHz, 5 MHz, 10 MHz, 15 MHz, and 20 MHz. Moreover, neither end of the Advanced system bandwidth has to be aligned with the border of the breakdown by the standard bandwidth.

Figure 7:
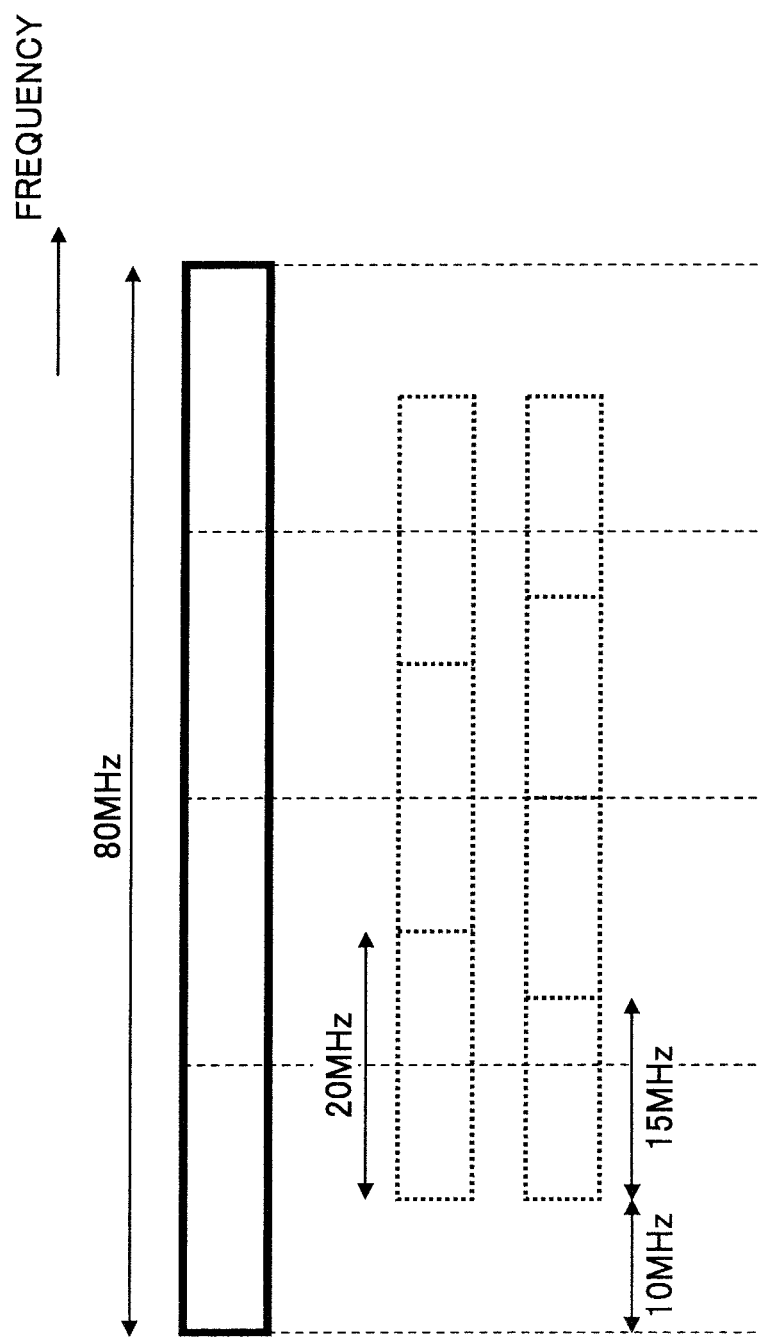
FIG. 7 is a diagram illustrating another setting example of a standard bandwidth and an area.

FIG. 7 shows, within an 80 MHz Advanced system bandwidth of the IMT-A system, a case such that three 20 MHz areas are included and a case such that four 15 MHz areas are included. In either case, neither end of the Advanced system bandwidth is aligned with the area of the standard bandwidth. Also in this case, any of the areas of the standard bandwidth is allocated to the LTE system. In this way, there may be various cases with respect to the mutual relationships among the area of the standard bandwidth, bandwidth of the LTE system, and the Advanced system bandwidth.

3. Uplink

Figure 8:
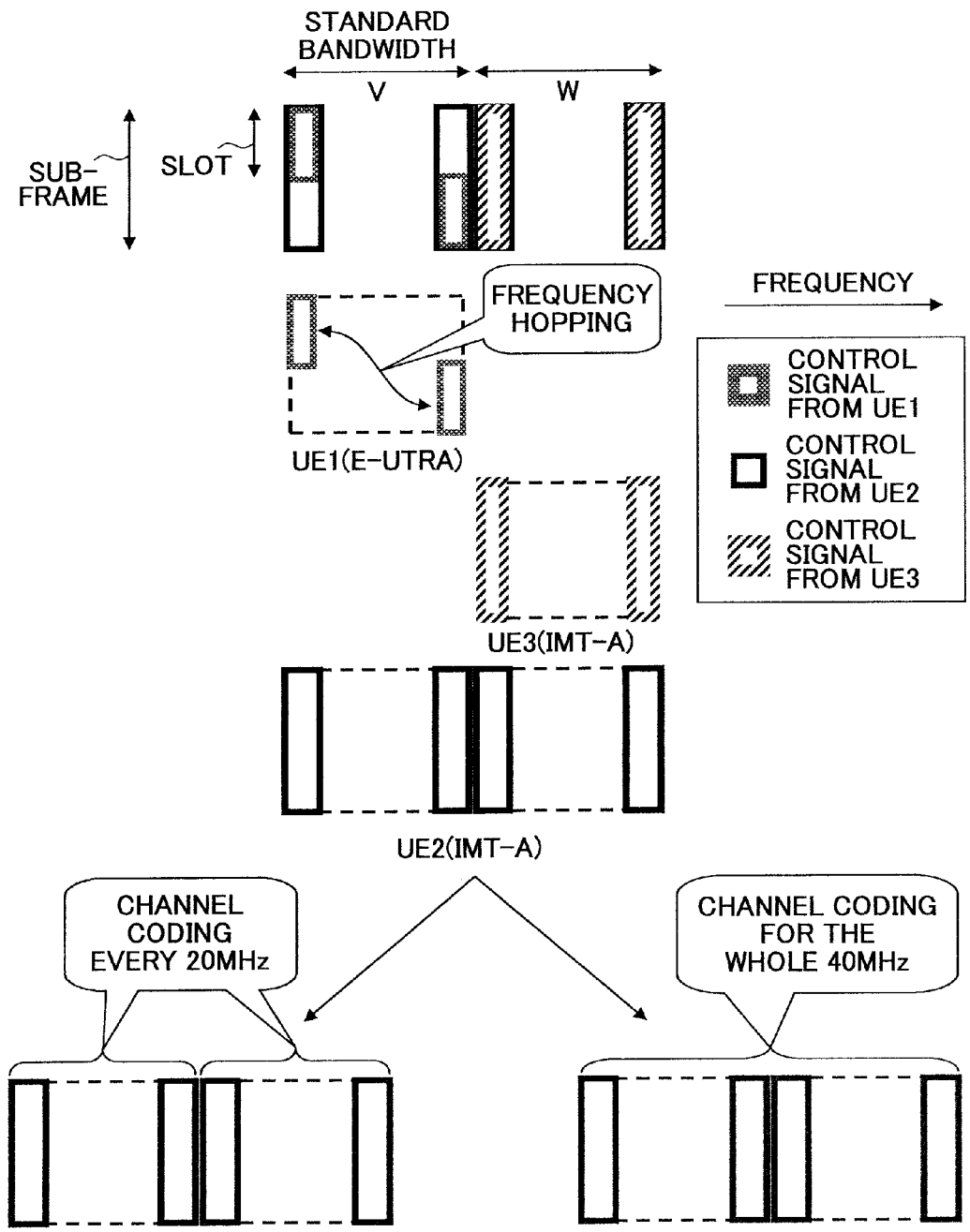
FIG. 8 is a diagram showing how a control signal is transmitted in uplink.

FIG. 8 shows how a control signal is transmitted in uplink according to one embodiment of the present invention. In the illustrated example, a 40 MHz system bandwidth is provided for an uplink IMT-A system, so that mobile communication is conducted in a variable system bandwidth which is not more than 40 MHz. The system bandwidth may vary from region to region or from cell to cell. It is not mandatory for all the users to be able to communicate in 40 MHz, so that there may be a user which can only communicate in a bandwidth such as 20 MHz, for example. Again for uplink, for convenience of explanations, a maximum system bandwidth provided in the IMT-A system is to be called an Advanced system band (the bandwidth thereof is an Advanced system bandwidth). The Advanced system bandwidth is divided into areas of a standard bandwidth, which, in the illustrated example, is 20 MHz. The two areas are specified as V and W for convenience. While not mandatory, this 20 MHz corresponds to the maximum bandwidth in the LTE system.

While in downlink 80 MHz is exemplified for the Advanced system bandwidth, in uplink 40 MHz is exemplified. The numerical value examples are merely exemplary, so that any other appropriate numerical value may be used. Therefore, the 80 MHz Advanced system bandwidth may also be provided for uplink. However, while higher speed and larger capacity are in strong demand in downlink, there may be numerous situations such that higher speed in uplink is not in such strong demand. Thus, in the example shown, only 40 MHz is provided for uplink.

As described above, in the LTE system, a resource dedicated for the control signal (PUCCH) is provided for both ends of the 20 MHz system bandwidth (See FIG. 4). Also in the present example, a resource dedicated for the control signal is provided at both ends of the 20 MHz standard bandwidth. The resource is provided from a point of view that a user of the LTE system can transmit an uplink control signal (PUCCH) regardless of whether the IMT-A system is present. Assuming the signal for the LTE system is transmitted in the area V, a resource for the control signal (PUCCH) is provided at least at both ends within the area V. As described in FIG. 4, an uplink signal in the LTE system is transmitted by a single-carrier scheme. In order to obtain a signal quality improvement effect through a frequency diversity effect while using a single-carrier scheme, the uplink control signal is transmitted while undergoing frequency hopping in between both ends of the standard bandwidth.

While the first user UE1 (E-UTRA) is subscribing to the LTE system, it is not subscribing to the IMT-A system. Thus, the uplink control signal (PUCCH) from the first user UE1 is transmitted while undergoing frequency hopping in a dedicated bandwidth at both ends of the area V.

The second user UE2 (IMT-A) is subscribing to the IMT-A system, making it possible to transmit in 40 MHz bandwidth. The uplink control signal of this user is transmitted using a resource provided for not only the area V but also the area W. Also in the area V, in a manner similar to the area W, a resource dedicated to the control signal is provided at both ends of the area. The uplink control signal may include any appropriate information. While not mandatory, a resource is not allocated to an uplink shared channel as in a case of the LTE system, so this resource may be used when reporting some information to the base station. For example, this resource may be used for reporting CQI to the base station periodically and/or for speedily reporting acknowledgement information (ACK/NACK) to a downlink data signal. It is not mandatory for the uplink control signal for the UE2 to use all resources provided in the areas V and W. For example, only the left side of the area V and the right side of the area W may be used. Based on the control information amount and/or required frequency diversity effect, an appropriate amount of resources may be determined.

While in the LTE system, a single-carrier scheme is adopted for uplink, in the IMT-A system shown, a multi-carrier scheme is allowed for uplink. In the present embodiment, in the IMT-A system, a more appropriate one of the single-carrier scheme and the multi-carrier scheme is selectively used for uplink. (A multi-carrier scheme is used in FIG. 8, while a single-carrier scheme is used in the below-described FIG. 9.) In a different embodiment, a single-, or multi-carrier scheme may be used for uplink in a fixed manner. Thus, within the areas V and W, the uplink control signals may be transmitted simultaneously using a different frequency.

While the third user UE3 (IMT-A) is also subscribing to the IMT-A system, it may transmit in uplink only in 20 MHz bandwidth. The uplink control signal for this user may be transmitted using the area V or W, but, in the example shown, is transmitted using only the area W. When the multi-carrier scheme is used, as shown, uplink control signals are simultaneously transmitted within the area W in different frequencies.

The control signals for the first, the second, and the third user are orthogonally multiplexed using an appropriate orthogonal multiplexing scheme. In the example shown, orthogonalization between the first user and the second user is performed using the code multiplexing scheme. Orthogonalization between the first user and the third user is performed using the frequency multiplexing scheme. Orthogonalization between the second user and the third user is performed using the code multiplexing scheme. These are merely exemplary.

As explained with respect to (1) and (2) in FIG. 5, when the control signal is transmitted across multiple areas, the channel coding of the control signal may be conducted for each area, or for all of the multiple areas. It is preferable from the point of view of increasing commonality between the LTE system and the IMT-A system to channel code for each area of the standard bandwidth. It is preferable from the point of view of improving the coding gain or the frequency diversity effect to provide for a collection of control signals across multiple areas to be channel coded.

Figure 9:
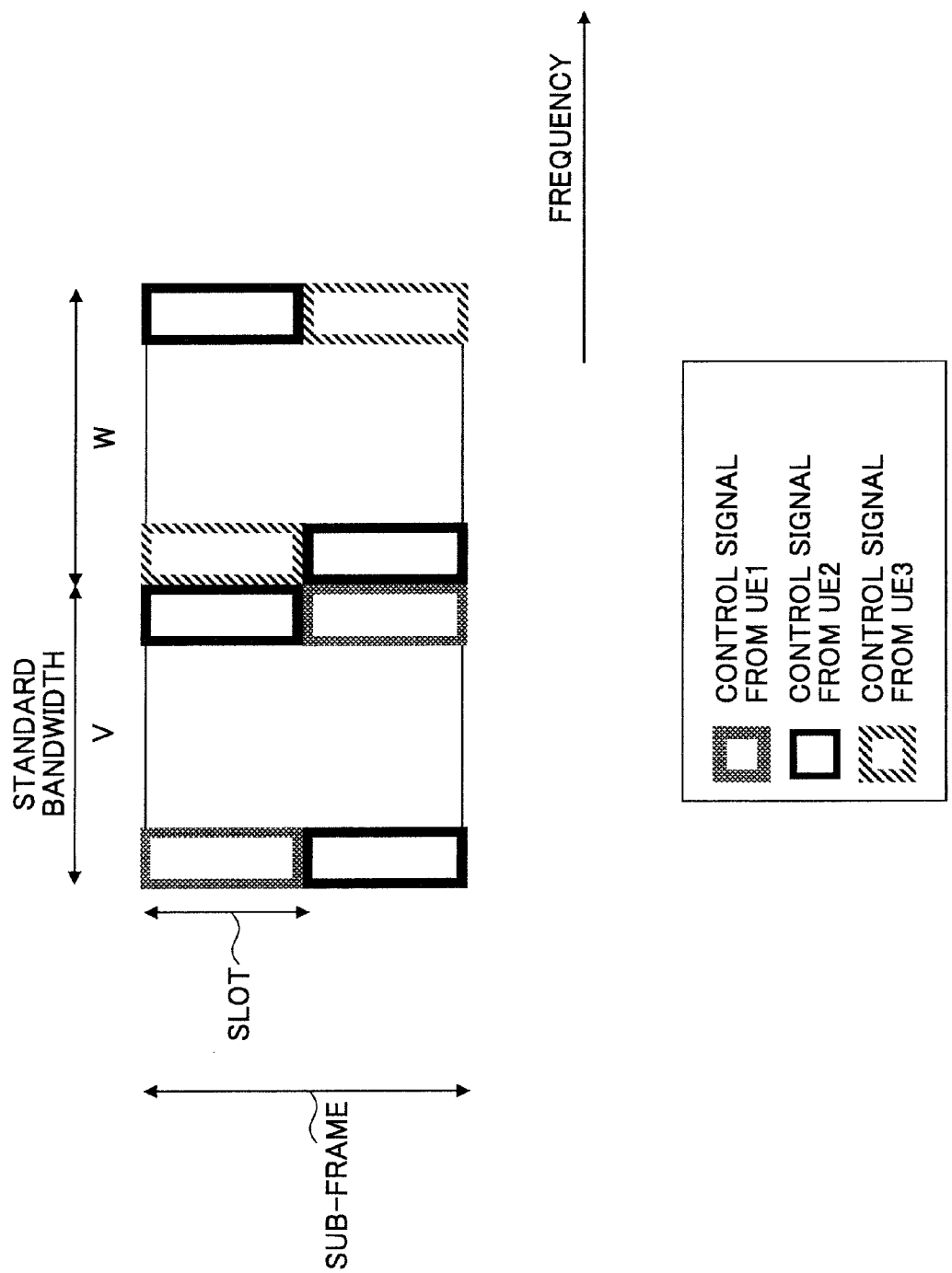
FIG. 9 is a diagram showing how a control signal is transmitted in downlink.

FIG. 9 shows how the uplink control signals from the UEs are transmitted in a single-carrier scheme. This may be advantageous when the amount of control information transmitted in uplink is small, for example.

4. Base Station Apparatus

Figure 10:
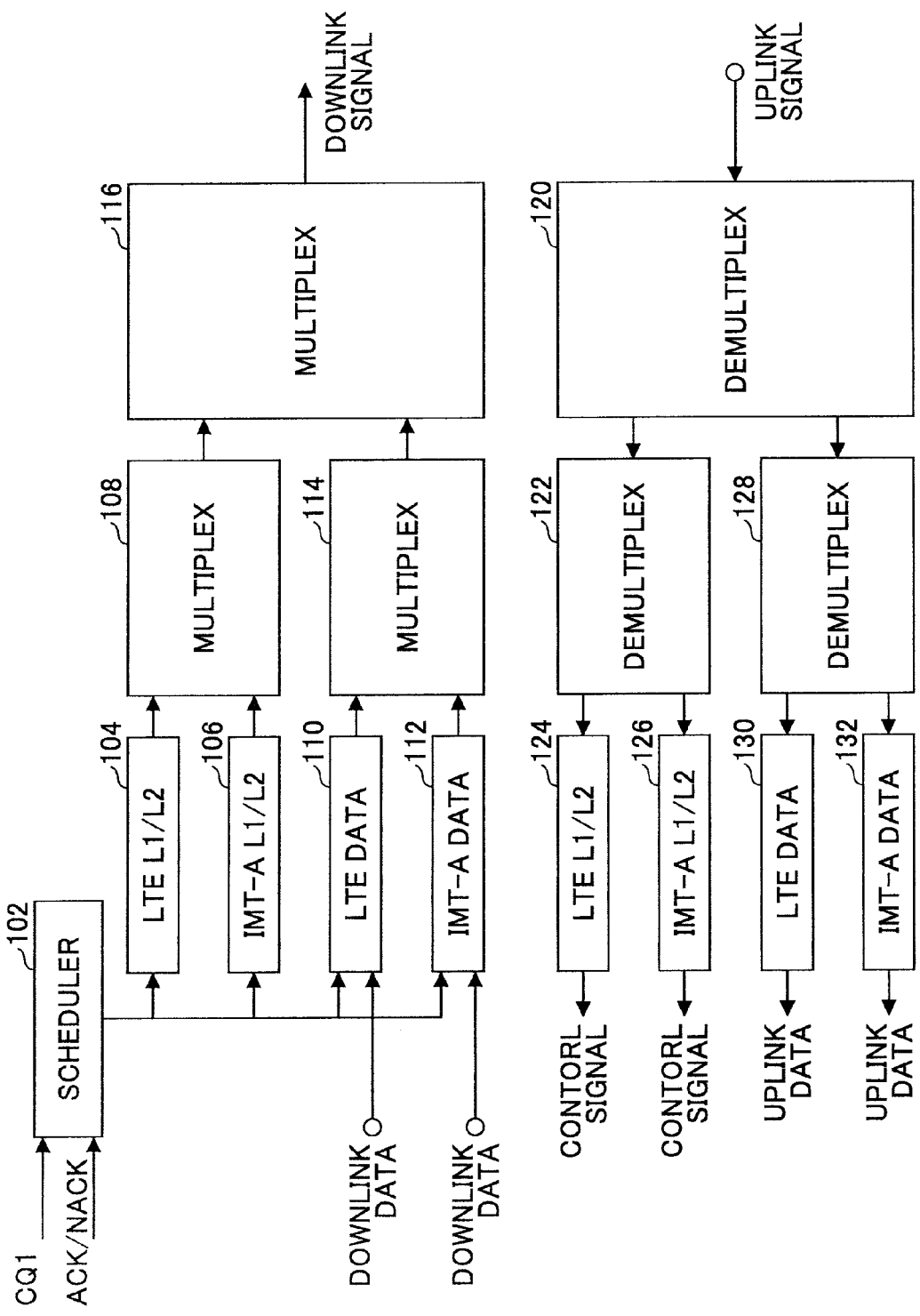
FIG. 10 is a diagram illustrating a partial functional diagram of a base station apparatus.

FIG. 10 illustrates a partial functional diagram of a base station apparatus. FIG. 10 shows, for downlink, a scheduler 102, a control signal generator 104 and a data signal generator 110 for the LTE system, a control signal generator 106 and a data signal generator 112 for the ITM-A system, and multiplexers 108, 114, and 116. FIG. 10 shows, for uplink, demultiplexers 120, 122, 128, a control signal demodulator 124 and a data signal demodulator 130 for the LTE system, and a control signal demodulator 126 and a data signal demodulator 132 for the IMT-A system.

The scheduler 102 prepares an allocation plan of (schedules) a radio resource in downlink and uplink. The scheduling may use any appropriate amount as a basis, or may be done based on any appropriate decision criteria and/or algorithm. As an example, for downlink, scheduling may be done based on CQI reported from the user apparatus. For uplink, scheduling may be done based on a received quality of a pilot signal received by the base station. Scheduling may be done according to a proportional fairness scheme, for example. In the present example, for downlink, scheduling is conducted not only for the 20 MHz-wide bandwidth for the LTE system, but also for the 80 MHz-bandwidth for the IMT-A system including the same. Also for uplink, scheduling is conducted not only for the 20 MHz-wide bandwidth for the LTE system, but also for the 40 MHz-bandwidth for the IMT-A system including the same. Scheduling is conducted, also taking into account adaptive modulation and channel coding schemes.

As described above, the LTE system is operating in an area of a specific standard bandwidth (20 MHz). The LTE system is operating in area Q for downlink and in area R for uplink. Therefore, scheduling information on the bandwidth of the area Q for downlink is provided to the control signal generator 104, while other scheduling information in downlink is provided to the control signal generator 106. Similarly, scheduling information on the bandwidth of the area R for uplink is provided to the control signal generator 104, while other scheduling information in uplink is provided to the control signal generator 106.

The control signal generator 104 for the LTE system generates a downlink control signal for the LTE system. As an example, the control signal generator 104 performs processes of channel coding, data modulation, interleaving, etc. to generate a downlink control signal. The downlink control signal is typically a PDCCH channel or an L1/L2 control channel. The downlink control channel is channel coded for each user, and mapped to a bandwidth within the area Q. The downlink control signal may be called a lower-layer control signal. This downlink control signal typically includes scheduling information, but may include other control information such as transmission power control information, etc.

The data signal generator 110 for the LTE system generates a downlink data signal for the LTE system. The data signal generator 110 performs processes of channel coding, data modulation, interleaving, etc., to generate a downlink data signal. This downlink data signal is called a PDSCH. As described above, the PDSCH may include user traffic data, broadcast information, upper layer control information, etc.

The control signal generator 106 for the IMT-A system generates a downlink control signal for the IMT-A system. The control signal generator 106 performs processes of channel coding, data modulation, interleaving, etc., to generate a downlink control signal. The control signal for the second user UE2, the control signal for the third user UE3, etc., that are described in FIG. 5 apply to this downlink control signal. This downlink control signal also typically includes scheduling information, but may include other control information such as transmission power control information, etc. While not mandatory, this downlink control signal is channel coded, and mapped to areas associated with individual users.

The data signal generator 112 for the IMT-A system generates a downlink data signal for the IMT-A system. The data signal generator 112 performs processes of channel coding, data modulation, interleaving, etc., to generate a downlink data signal. The downlink data signal also may include user traffic data, broadcast information, high layer control information, etc.

The multiplexers 108, 114, and 116 orthogonally multiplex signals input thereto in any appropriate scheme. As an example, a control signal for the LTE system and a control signal for the IMT-A system are orthogonally multiplexed using a multiplexer 108 in units of resource elements using frequency division multiplexing (FDM) and time division multiplexing (TDM) as shown in FIG. 5. The data signal for the LTE system and the data signal for the IMT-A system are orthogonally multiplexed using a multiplexer 114 in units of resource blocks using frequency division multiplexing (FDM), as an example. The control signal and the data signal are orthogonally multiplexed by the multiplexer 116 using the time division multiplexing (TDM) scheme. When multiplexing, the code division multiplexing (CDM) scheme may be used as well.

The demultiplexers 120, 122, and 128 demultiplex a multiplexed signal input thereto into signals existing before multiplexing. The demultiplexer 120 demultiplexes, in a TDM scheme, a control signal and a data signal received from each user. The demultiplexer 122 demultiplexes a signal into a control signal for the LTE system and a control signal for the IMT-A system using a FDM scheme and a TDM scheme. The demultiplexer 128 demultiplexes a signal into a data signal for the LTE system and a data signal for the IMT-A system using an FDM scheme. As described above, the signal for the IMT-A system may be transmitted in a bandwidth wider than the basic bandwidth (20 MHz). Therefore, the demultiplexers 128, 122 take out a control signal while taking into account a transmission bandwidth of each user.

The control signal demodulator 124 for the LTE system applies processes of deinterleaving, demodulation, decoding, etc., to an uplink control signal for the LTE system and takes out control information from each user. A CQI which indicates downlink channel condition and/or acknowledgement information (ACK/NACK) for the downlink data signal is reported to the scheduler 102 to be taken into consideration in subsequent scheduling.

The control signal demodulator 130 for the LTE system applies processes of deinterleaving, demodulation, decoding, etc., to an uplink control signal for the LTE system and takes out traffic information from each user. The traffic data applies error detection and error correction by a functional element (not shown), and, in case retransmission is required, that is reported to the scheduler 102.

The control signal demodulator 126 for the IMT-A system applies processes of deinterleaving, demodulation, decoding, etc., to an uplink control signal for the IMT-A system and takes out control information from each user. A CQI which indicates downlink channel condition and/or acknowledgement information (ACK/NACK) for the downlink data signal is reported to the scheduler 102 to be taken into consideration in subsequent scheduling.

The data signal demodulator 132 for the IMT-A system applies processes of deinterleaving, demodulation, decoding, etc., to an uplink data signal for the IMT-A system and takes out traffic information from each user. The traffic data applies error detection and error correction by a functional element (not shown), and, in case retransmission is required, that is reported to the scheduler 102.

5. User Apparatus

Figure 11:
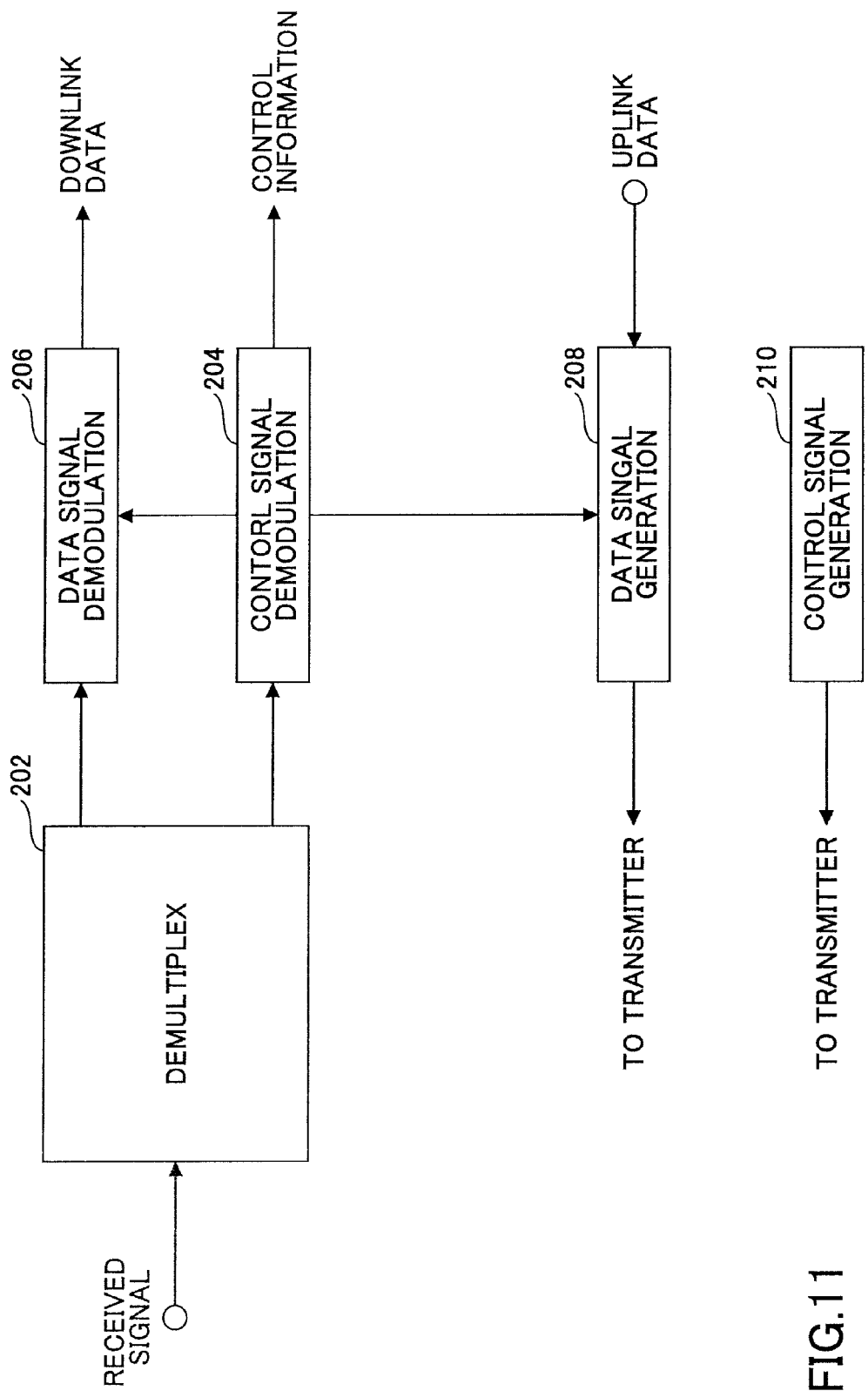
FIG. 11 is a diagram illustrating a partial functional diagram of a user apparatus.

FIG. 11 is a diagram illustrating a partial functional diagram of a user apparatus. This user apparatus is used in the IMT-A system. The user apparatus used in the LTE system also has the same elements, but different features and/or processes exist due to bandwidths of signals handled being different. FIG. 11 shows a demultiplexer 202, a downlink control signal demodulator 204, a downlink data signal demodulator 206, an uplink data signal generator 208, and an uplink control signal generator 210.

The demodulator 202 demodulates a received signal into a control signal and a data signal. The demultiplexing is primarily conducted using a TDM scheme.

The downlink control signal demodulator 204 checks whether or not a control signal intended for own apparatus is included in a received downlink control signal, and, if yes, checks the contents thereof. As described above, the control signal typically includes scheduling information.

When a downlink data signal for the own apparatus has been transmitted, the downlink data signal demodulator 206 receives the same according to the scheduling information.

When transmission of an uplink data signal from the own apparatus is allowed, the uplink data signal generator 208 provides an uplink data signal according to the scheduling information.

The uplink control signal generator 210 provides an uplink control signal such that the uplink control signal is transmitted in methods described with reference to FIGS. 8 and 9.

When the downlink control signal is taken out of the received signal, the user apparatus checks whether the control signal intended for the own apparatus is included therein. For a user apparatus of the LTE system, a blind detection is attempted with respect to a signal of a bandwidth of 20 MHz that corresponds to the area Q in FIG. 5. As an example, first, own apparatus identification information (UE-ID) is used to attempt decoding a control signal for one user using identification information (UE-ID) for an own apparatus. A CRC error detection result of the decoding result is checked to determine whether the decoding has succeeded. If the decoding succeeds, the control information is verified as information intended for own apparatus. If the decoding of the control signal of a predetermined number of users fails, the user apparatus waits for the next sub-frame signal. If the control signal intended for the own apparatus is present, downlink and/or uplink communications are conducted according to the control signal.

For a user apparatus of an IMT-A system, each user attempts a blind detection according to an area to which a control signal of an own apparatus may be mapped. For example, for the second user UE2 (IMT-A) in FIG. 5, a blind detection is attempted on a signal of the entire four areas P, Q, R, and S (80 MHz in total). For the third user UE3 (IMT-A) in FIG. 5, a blind detection is attempted on a signal of two areas R and S (40 MHz). As an example, first, own apparatus identification information (UE-ID) is used to attempt decoding a control signal. A CRC error detection result of decoding results is checked to determine whether the decoding has succeeded. If the decoding succeeds, the control information thereof is verified as information intended for the own apparatus. If the decoding of the control signal of a predetermined number of users fails, the user apparatus waits for the next sub-frame signal. If the control signal intended for the own apparatus is present, downlink and/or uplink communications are conducted according to the control signal.

In this way, when a user apparatus of the LTE system searches for a control signal for the own apparatus, it does not have to know how a control signal of the IMT-A system is transmitted. Therefore, for a user of the LTE system, it appears as if only the LTE system is present in the area. On the other hand, when a user apparatus of the IMT-A system searches for a control signal for the own apparatus, it does not have to know how a control signal of the LTE system is transmitted. Therefore, for a user of the IMT-A system, it appears as if only the IMT-A system is present in the area.

The present invention is widely applicable when different systems of maximum system bandwidths co-exist, so that it is not limited to the above-described embodiments. For example, the present invention may be applied to any appropriate combination of an HSDPA/HSUPA W-CDMA system, an LTE system, an IMT-Advanced system, a WiMAX system, a Wi-Fi system, etc.

While the present invention has been described with reference to specific embodiments, the embodiments are merely exemplary, so that a person skilled in the art would understand variations, modifications, substitutions, replacements, etc. While specific numerical values are used to facilitate understanding of the present invention, such numerical values are merely examples, so that any appropriate value may be used unless specified otherwise. While specific mathematical expressions are used to facilitate understanding of the present invention, such mathematical expressions are merely examples, so that any appropriate mathematical expression may be used unless specified otherwise. The breakdown of items is not essential to the present invention, so that matters described in the items may be appropriately combined as long as they do not contradict each other. For convenience of explanations, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The invention claimed is:

1. A base station apparatus used in a region in which at least a first system and a second system co-exist, wherein
   mobile communication is conducted in the first system using a variable system bandwidth not more than a basic bandwidth,
   mobile communication is conducted in the second system using a variable system bandwidth which is not more than a bandwidth of an advanced system band which is at least as wide as multiple of the basic bandwidth,
   the base station apparatus, comprising:
      a first generating unit which generates a control signal for the first system;
      a second generating unit which generates a control signal for the second system;
      a multiplexing unit which orthogonally multiplexes the control signals for the first generating unit and the second generating unit; and
      a transmitting unit which transmits a downlink signal including the control signals after the orthogonal multiplexing, wherein
   the advanced system band is divided such that it includes multiple areas of the basic bandwidth,
   the control signal for the first system is arranged to be included in one of the areas; and
   the control signal for the second system is arranged to be included in at least one of the areas.

2. The base station apparatus as claimed in claim 1, wherein the control signal for the second system is included in the multiple areas and is channel encoded for each of the areas.

3. The base station apparatus as claimed in claim 1, wherein the control signal for the second system is included in the multiple areas, and a unit for channel coding the control signal is all of the multiple areas.

4. The base station apparatus as claimed in claim 1, wherein the control signal for the second system is arranged to be included within one of the areas.

5. The base station apparatus as claimed in claim 4, wherein the one of the areas in which the control signal for the second system is included is set for each user.

6. The base station apparatus as claimed in claim 1, wherein the control signals after the orthogonal multiplexing and a data signal including user traffic data are orthogonally multiplexed using at least a time division multiplexing scheme.

7. A method used in a region in which at least a first system and a second system co-exist, wherein
   mobile communication is conducted in the first system using a variable system bandwidth which is not more than a basic bandwidth, and
   mobile communication is conducted using a variable system bandwidth which is not more than a bandwidth of an advanced system band which is at least as wide as multiple of the basic bandwidth,
   the method comprising:
      a first generating step which generates a control signal for the first system;
      a second generating step which generates a control signal for the second system;
      a multiplexing step which orthogonally multiplexes the control signals for the first generating and the second generating; and
      a transmitting step which transmits a downlink signal including the control signals after the orthogonal multiplexing, wherein
   the advanced system band is divided such that it includes multiple areas of the basic bandwidth,
   the control signal for the first system is arranged to be included in one of the areas; and
   the control signal for the second system is arranged to be included in at least one of the areas.

8. A user apparatus of a second system used in a region in which at least a first system and the second system co-exist, wherein
   mobile communication is conducted in the first system using a variable system bandwidth which is not more than a basic bandwidth,
   mobile communication is conducted using a variable system bandwidth which is not more than a bandwidth of an advanced system band which is at least as wide as multiple of the basic bandwidth,
   the user apparatus comprising:
      a demultiplexing unit which demultiplexes a control signal within a received signal from other signals;

an obtaining unit which takes out, from the control signal, control information intended for an own apparatus; and a unit which receives or transmits a data signal including user traffic data according to control information intended for the own apparatus, wherein the advanced system band is divided such that it includes multiple areas of the basic bandwidth, the control signal for the first system is included in one of the areas; and the control signal for the second system is included in at least one of the areas.

9. The user apparatus as claimed in claim 8, wherein the control signal for the second system is included in the multiple areas and is channel decoded for each of the areas.

10. The user apparatus as claimed in claim 8, wherein the control signal for the second system is included in the multiple areas, and a unit for channel decoding the control signal is all of the multiple areas.

11. The user apparatus as claimed in claim 8, wherein the control signal for the second system is included within one of the areas.

12. A method used in a user apparatus of a second system used in a region in which at least a first system and the second system co-exist, wherein mobile communication is conducted in the first system using a variable system bandwidth which is no more than a basic bandwidth, and mobile communication is conducted using a variable system bandwidth which is not more than a bandwidth of an advanced system band which is at least as wide as multiple of the basic bandwidth, the method comprising:

a demultiplexing step which demultiplexes a control signal within a received signal from other signals;

an obtaining step which takes out, from the control signal, control information intended for an own apparatus; and a step which receives or transmits a data signal including user traffic data according to the control information intended for the own apparatus, wherein the advanced system band is divided such that it includes multiple areas of the basic bandwidth, a control signal for the first system is included in one area; and the control signal for the second system is included in at least one of the areas.

* * * * *